J. G. KEOUGH.
LUBRICATOR.
APPLICATION FILED APR. 10, 1920.
1,367,149.
Patented Feb. 1, 1921.
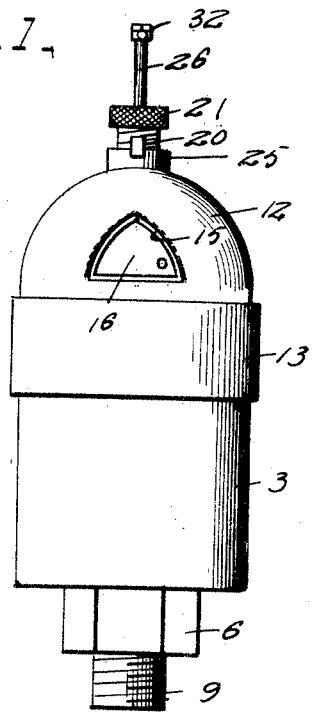
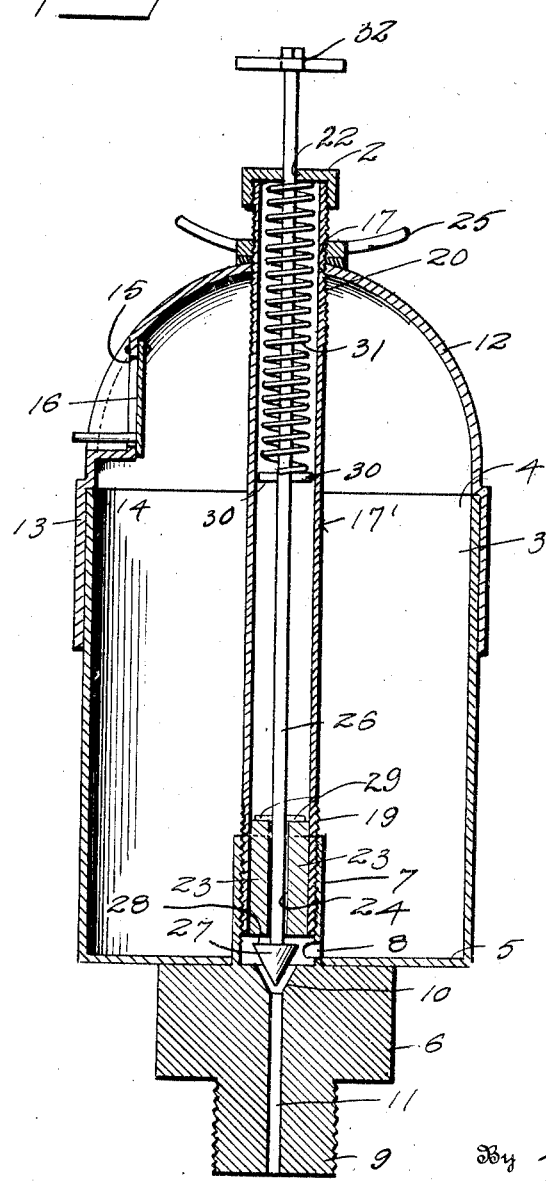
Inventor
J. G. Keough
By Watson E. Coleman
Attorney

UNITED STATES PATENT OFFICE.

JAMES G. KEOUGH, OF BROOKVILLE, PENNSYLVANIA.

LUBRICATOR.

1,367,149.  Specification of Letters Patent.  Patented Feb. 1, 1921.

Application filed April 10, 1920. Serial No. 372,868.

*To all whom it may concern:*

Be it known that I, JAMES G. KEOUGH, a citizen of the United States, residing at Brookville, in the county of Jefferson and State of Pennsylvania, have invented certain new and useful Improvements in Lubricators, of which the following is a specification, reference being had to the accompanying drawings.

This invention relates to lubricators and particularly to a lubricator for use on moving parts of machinery, and has for its object to provide a lubricator of this character which can be readily operated and filled without removing the cover.

Another object is to provide a lubricator of this character which regulates the quantity of oil discharged from the lubricator without interfering with the closing power of the valve.

A further object of the invention is to provide a lubricator of this character wherein the valve can be positioned at various distances with respect to the outlet of the lubricator, and wherein the valve can be readily discharged to tightly close the outlet regardless of its adjusted position.

A still further object is to provide a lubricator of this character including an adjustable valve support, in which a valve is mounted, said valve being adjustable with the support at certain times, and movable independently of the support to close the outlet of the lubricator.

With these and other objects in view, the invention consists in the improved construction and arrangement of parts to be hereinafter more particularly described, fully claimed and illustrated in the accompanying drawings, in which:—

Figure 1 is a vertical elevation of a lubricator constructed in accordance with an embodiment of the invention, Fig. 2 is a longitudinal sectional view, Fig. 3 is a fragmentary top plan and sectional view showing the position of the supporting lugs when the valve is disengaged from the valve seat.

Referring to the drawings 3 designates a reservoir or oil cup including an open end 4 and a closed end 5. An outlet member is formed integral with or otherwise secured to the closed end of the oil cup, and comprises a many sided base or nut member 6 from the upper surface of which an internally threaded socket 7 projects. The socket 7 extends through the closed end of the oil cup and is provided with an oil outlet 8 through which the lubricant passes into the outlet member. Projecting from the lower surface of the member 6 is an exteriorly threaded stem 9 adapted to secure the lubricator to the desired part or place. The upper portion of the base member 6 within the socket 7 is formed into a valve seat 10. An oil outlet passage 11 communicates with the valve seat and extends through the member 6 and stem 9. The end portion 4 of the oil cup is closed by means of a cover 12 which is preferably dome-shaped at its upper portion and includes an outwardly projecting annular flange 13, a shoulder 14 being formed at the junction of the flange with the dome, the shoulder being intended to engage the end of the oil cup. The cover is provided with an inlet opening 15 which is closed by a valve plate 16. By this means the lubricator can be supplied with oil without removing the cover 12. The cover is also provided with a central opening 17 through which the valve mechanism extends.

The valve mechanism, comprising a tubular valve supporting and adjusting member 17, has its end 19 adjustably threaded in the socket 7, the end portion 20 being threaded in the cover 12. The last mentioned end portion of the valve support is provided with a cap 21 having a central opening 22 and a knurled periphery.

Disposed inwardly of the end 19 of the valve support is a pair of opposed elongated shoulders 23, the lugs terminating in spaced parallel relation to provide a passage 24. The end portion 20 of the support below the cap 21 is exteriorly threaded and adapted to receive a securing nut 25. After the valve support has been threaded the desired distance through the cover, the nut 25 is rotated into engagement with the cover to hold the valve support in position and prevent accidental movement. It also holds the cover on the oil cup, through the medium of the socket 7.

In order to close the outlet passage 4, a valve mechanism is provided and comprises a valve stem 26 having one end thereof enlarged and tapered to provide a valve 27. The valve is intended to snugly engage the valve seat 10 of the outlet. The end 28 of the valve is intended to limit upward movement of the valve stem by engagement with the end 19 of the valve support.

Projecting from the stem 26 in spaced relation to the end 28 of the valve is a pair of opposed lugs 29, adapted at certain times to slide between the shoulders 23, and also to engage said shoulders to hold the valve in spaced relation with respect to the valve seat. Projecting from the valve stem adjacent the intermediate portion thereof and in spaced relation to the lugs 29 is a pair of opposed lugs 30, adapted to support a spring 31 which surrounds the upper end of the valve stem. The other end of the spring is intended to engage the lower surface of the cap 21, the valve stem 26 being slidable through the opening 17 of the cap. A nut 32 is threaded on the upper end of the valve stem and serves as an operating knob.

In use of the device, the valve support may be adjusted either when the valve is closed or when opened. If the valve 27 is engaged with the valve seat 10 of the outlet, and it is desired to discharge a quantity of oil, the stem 26 is rotated by the knob 32 so as to permit the lugs 29 to pass through the passage 24 between the shoulders 23. This is accomplished by a half turn of the valve stem. When the lugs 29 pass above the shoulders 23, the valve stem is then released. The lugs 29 will then engage the upper surface of the shoulders 23 and position the valve 27 in spaced relation to the passage 13 according to the adjusted position of the valve support.

To increase the flow of oil when the lubricator is in operation, it is not necessary to close the outlet, but simply loosen the nut 25 and adjust the valve support with respect to the cover, and socket by means of the cap 21 thereby moving the valve away from the valve seat. When it is desired to close the lubricator it is not necessary to adjust or interfere with the adjusted position of the valve support, but simply rotate the valve stem 22 so as to permit the lugs 29 to pass through the passage 24 whereupon the extension spring will cause the valve 27 to close the outlet.

From the foregoing, it will be readily seen that this invention provides a novel form of lubricator, all parts of which can be readily disassembled for cleaning or other purposes, and the reservoir filled through the opening 15. Furthermore, the quantity of oil to be discharged can be regulated by rotating the valve support within the oil cup so as to cause the valve 27 to move toward or away from the valve seat. This adjustment is possible regardless of whether the lugs 29 are engaged with the shoulders 23 or the valve 27 engaged with the valve seat 10. In addition to this, the valve stem operates independently of the valve support to close the outlet so that the adjusted position of the valve support does not interfere with or decrease the closing power of the valve or force of the spring 31. The lubricator can be either opened or closed by a half turn of the valve stem.

The invention having been set forth, what is claimed as new and useful is:—

1. A lubricator comprising a reservoir, an outlet member carried by one end of the reservoir, a socket member projecting inwardly of the reservoir, said socket having an inlet opening, a valve seat at the bottom of said socket, a valve casing having one end adjustably disposed within said socket, a pair of opposed shoulders in said end of the casing, a valve stem and valve freely mounted in said casing, said stem being movable between the shoulders, lugs projecting from said stem, said lugs being movable into engagement with the shoulders, whereby the valve and valve stem move with the valve casing in the adjustment thereof.

2. A lubricator comprising a reservoir, an outlet member carried by one end of the reservoir, a socket member projecting inwardly of the reservoir, said socket having an inlet opening, a valve seat at the bottom of said socket, a valve casing having one end adjustably disposed within said socket, a pair of opposed shoulders in said end of the casing, a valve stem and valve freely mounted in said casing, said stem being movable between the shoulders, lugs projecting from said stem, said lugs being movable between the shoulders with the stem whereby the valve is permitted to operate independently of the adjustable casing.

3. A lubricator comprising a reservoir, open at one end, a cover for closing said end, an outlet member including an outlet socket carried by the opposite end of the reservoir, a valve casing externally threaded at each end, a cap carried by the first mentioned end of the casing, a pair of opposed shoulders disposed inwardly of the second mentioned end of the casing, the first mentioned end of said casing being rotatably mounted in said cover and projecting therethrough, the second mentioned end of said casing being rotatably mounted within the socket, a valve stem freely mounted within said casing, one end of said stem projecting through the cap of the casing, the other end projecting beyond the opposite end of the casing, into the socket, the last mentioned end of the stem being provided with a valve, said valve being movable within the socket between the second mentioned end of the casing and the outlet member, means carried by said stem for engagement with the inner ends of said shoulders to hold the valve in open position, said means being movable with the casing away from the outlet at certain times, and means for urging said valve and the first mentioned means toward the outlet member for closing the same.

In testimony whereof I hereunto affix my signature.

JAMES G. KEOUGH.